US012054374B1

(12) United States Patent
Dongmei

(10) Patent No.: US 12,054,374 B1
(45) Date of Patent: Aug. 6, 2024

(54) MOVEABLE DISASSEMBLING AND ASSEMBLING PLATFORM

(71) Applicant: Guangzhou Mailong Network Technology Co., Ltd, Guangzhou (CN)

(72) Inventor: Chen Dongmei, Jiangmen (CN)

( * ) Notice: Subject to any disclaimer, the term of this patent is extended or adjusted under 35 U.S.C. 154(b) by 0 days.

(21) Appl. No.: 18/536,642

(22) Filed: Dec. 12, 2023

(51) Int. Cl.
*B66F 7/02* (2006.01)
*B66F 7/28* (2006.01)

(52) U.S. Cl.
CPC . *B66F 7/02* (2013.01); *B66F 7/28* (2013.01)

(58) Field of Classification Search
CPC .................................... B66F 7/02; B66F 7/28
See application file for complete search history.

(56) References Cited

U.S. PATENT DOCUMENTS 3,937,443 A * 2/1976 Durgan .................... B66F 5/04 254/134
4,383,681 A * 5/1983 Walters .................. B66F 7/246 269/69
4,804,162 A * 2/1989 Rice .................... F16M 11/046 248/129
5,884,399 A * 3/1999 Bergstrom ........... G01B 5/0025 33/608
6,322,061 B1 * 11/2001 Maser .................. B25H 1/0007 269/69
D856,626 S * 8/2019 Freilich .......................... D34/31
D1,006,391 S * 11/2023 Huang ........................... D34/28
2001/0040233 A1 * 11/2001 Chamberlain ............ B66F 7/02 254/4 R
2003/0221914 A1 * 12/2003 Smith ..................... B66F 9/122 187/244
2010/0102284 A1 * 4/2010 Drake ....................... B66F 7/02 254/1

* cited by examiner

*Primary Examiner* — Seahee Hong

(57) ABSTRACT

A moveable disassembling and assembling platform is disclosed, including an underframe, a stand, a lifting platform, and a pulley mechanism. At least two first supporting mechanisms spacing arranged in front and back are provided on both left and right sides of the lifting platform, and a second supporting mechanism is provided on a front side of the lifting platform. By using the pulley mechanism to drive the lifting platform to lift up and down, and cooperating with the first and the second supporting mechanisms to provide a solid and effective support for large automobile parts such as hard tops and soft tops, it can be operated by only one person, thereby reducing labor and improving efficiency, and meanwhile the moveable disassembling and assembling platform has a simple overall structure and low cost, which is worthy of popularization.

1 Claim, 3 Drawing Sheets

MOVEABLE DISASSEMBLING AND ASSEMBLING PLATFORM

TECHNICAL FIELD

The present application relates to the technical field of disassemble and assemble equipments, in particular to a movable disassembling and assembling platform, and specifically to a movable disassembling and assembling platform for automobiles.

BACKGROUND

In a process of automobile maintenance, it is often necessary to carry out dismantling and assembling of automobile parts such as a hard top canopy, a soft top canopy, front and rear bumpers, etc. In existing technologies, for these large automobile parts, a forklift truck is mainly used, together with at least two operators are used for the dismantling and assembling, which is labor-intensive, inefficient, and requires use of the forklift truck, and the cost is high. Therefore, it is necessary to develop a new solution to solve these problems.

SUMMARY

In view of deficiencies in the existing technologies, the present disclosure aims to provide a new movable disassembling and assembling platform to effectively address existing problems of labor-consuming, low efficiency and high cost of disassembling and assembling automobile parts such as the hard top canopy, the soft top canopy, front and rear bumpers, and so on.

To realize above objectives, the present disclosure adopts following technical solutions. In some embodiments of the present disclosure, a moveable disassembling and assembling platform is provided, including an underframe, a stand, a lifting platform, and a pulley mechanism. Herein, the underframe is configured with a plurality of casters at bottom, and the stand is fixed vertically to a rear side of the underframe. The lifting platform is configured to be lifted up and down on the stand and extend forwardly, at least two first supporting mechanisms spacing arranged in front and back are provided on both left and right sides of the lifting platform, each of the first support mechanisms is configured to be front- and back-adjustable positionally mounted on the lifting platform, and a second supporting mechanism is provided on a front side of the lifting platform. The pulley mechanism is disposed between the stand and the lifting platform to drive the lifting platform for lifting and lowering movements.

In some preferred embodiments of the present disclosure, the stand includes two uprights and a crossbeam, the two uprights are configured to be provided left and right and fixed vertically to the rear side of the underframe, and two ends of the crossbeam are configured to be fixedly connected to tops of the two uprights, respectively.

In some preferred embodiments of the present disclosure, the two uprights are formed with guide slots on inner sides and the guide slots extend vertically, the lifting platform is configured with rotatable guide wheels on both sides of a rear end, and the guide wheels are configured to be embedded in the guide slots and move back and forth along the guide slots.

In some preferred embodiments of the present disclosure, the lifting platform is a retractable lifting platform, and the retractable lifting platform includes a main frame and a retractable shelf, a rear end of the main frame is configured to be mounted on the stand and extends forward and backward, the retractable shelf is configured to be mounted on a front end of the main frame in a fore-aft retractable movement adjustable manner, and the second supporting mechanism is provided on a front side of the retractable shelf.

In some preferred embodiments of the present disclosure, the main frame is opened with a plurality of first pin holes spacing arranged in front and back on both left and right side surfaces, a rear end of the retractable shelf is inserted into a front interior of the main frame, a plurality of second pin holes spacing arranged in front and back are provided on both left and right sides of the retractable shelf, and the second pin holes are configured to mate with the first pin holes.

In some preferred embodiments of the present disclosure, the first supporting mechanism includes a first fixed rod, a first movable rod, and a first retractable rod. Herein the first fixed rod extends horizontally from left to right, an inner end of the first fixed rod is configured to clamp a side edge of the main frame and the inner end of the first fixed rod is opened with a third pin hole, the third pin hole is configured to mate with the first pin holes, and the inner end of the first fixed rod is opened with a first mounting hole. The first movable rod extends vertically and is inserted into the first mounting hole to move up and down along the first mounting hole, and the first movable rod is opened with a plurality of fourth pin holes spacing arranged up and down. The first retractable rod extends vertically and is provided at an upper end of the first movable rod, the first retractable rod is retracted up and down with respect to the first movable rod, the first retractable rod is opened with a fifth pin hole cooperating with the fourth pin holes, and the first retractable rod is fixed with a first disk or a first U-shaped disk at a top.

In some preferred embodiments of the present disclosure, the second supporting mechanism includes a second fixed rod, a second movable rod and a second retractable rod. Herein the second fixed rod extends horizontally back and forth, an inner end of the second fixed rod clamps the front side of the retractable shelf, and the inner end of the second fixed rod is opened with a sixth pin hole and a second mounting hole. The second movable rod extends vertically and is inserted into the second mounting hole to move up and down along the second mounting hole, and the second movable rod is opened with a plurality of seventh pin holes spacing arranged up and down. The second retractable rod extends vertically and is provided at an upper end of the second movable rod, the second retractable rod is retracted up and down with respect to the second movable rod, the second retractable rod is opened with an eighth pin hole cooperating with the seventh pin holes, and the second retractable rod is fixed with a second disk or a second U-shaped disk at a top.

In some preferred embodiments of the present disclosure, the pulley mechanism is a hand-operated pulley mechanism and the hand-operated pulley mechanism includes a first pulley, a second pulley, a third pulley, a reel, a rocker arm and a dragrope. Herein the first pulley is rotatably disposed at middle on a rear side of the lifting platform, the second pulley is rotatably disposed at middle of the crossbeam, and the third pulley is rotatably disposed at an end of the third crossbeam. The reel and the rocker arm are rotatably disposed on outside of one of the uprights, the reel is located below the third pulley, the rocker arm drives the reel to rotate back and forth, one end of the dragrope is fixedly connected to the middle of the crossbeam, and the dragrope is wrapped around the reel after winding through the first pulley, the second pulley, and the third pulley in turn.

In some preferred embodiments of the present disclosure, the two uprights are provided with handles on a rear side.

In some preferred embodiments of the present disclosure, the casters are configured with four, two of the casters are provided at bottom of left and right sides of a front end of the underframe, and the other two casters are casters with locking mechanisms and disposed at bottom of left and right sides of a back end of the underframe.

The present disclosure has significant advantages and beneficial effects over the existing technologies. Specifically, by using the pulley mechanism to drive the lifting platform to lift up and down, and cooperating with the first and the second supporting mechanisms to provide a solid and effective support for large automobile parts such as hard tops and soft tops, it can be operated by only one person, thereby reducing labor and improving efficiency, and meanwhile the moveable disassembling and assembling platform has a simple overall structure and low cost, which is worthy of popularization.

Figure 1:
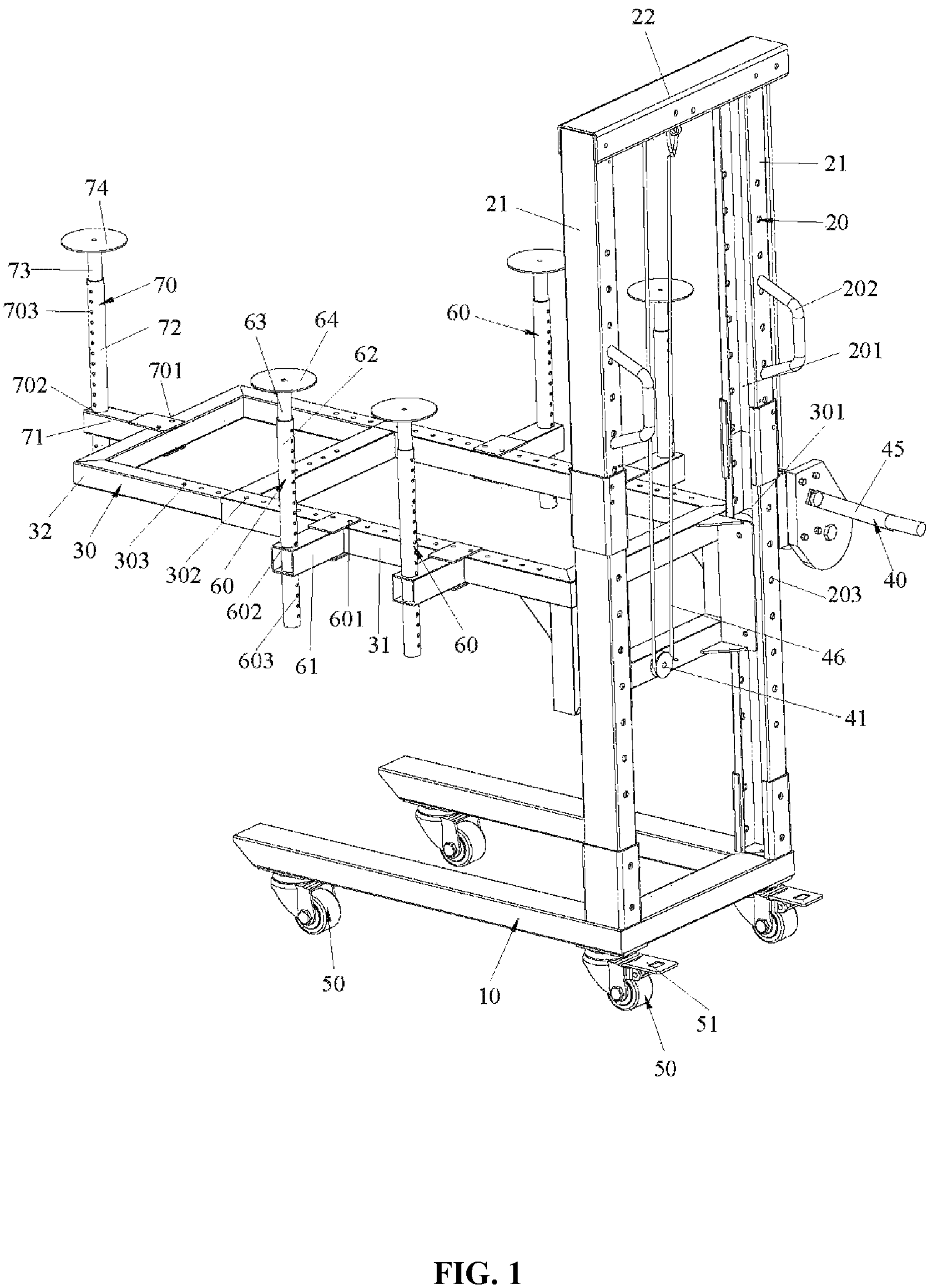
FIG. 1 is a stereoscopic diagram of a moveable disassembling and assembling platform in accordance with some preferred embodiments of the present disclosure.

In the drawings, reference signs are as follows.

| | | | |
|---|---|---|---|
| 10 | underframe | 20 | stand |
| 21 | upright | 22 | crossbeam |
| 201 | guide slot | 202 | handle |
| 203 | locking hole | 30 | lifting platform |
| 31 | main frame | 32 | retractable shelf |
| 301 | guide wheel | 302 | first pin hole |
| 303 | second pin hole | 40 | pulley mechanism |
| 41 | first pulley | 42 | second pulley |
| 43 | third pulley | 44 | reel |
| 45 | rocker arm | 46 | dragrope |
| 50 | caster | 51 | locking mechanism |
| 60 | first supporting mechanism | 61 | first fixed rod |
| 62 | first movable rod | 63 | first retractable rod |
| 64 | first disk | 601 | third pin hole |
| 602 | first mounting hole | 603 | fourth pin hole |
| 70 | second supporting mechanism | 71 | second fixed rod |
| 72 | second movable rod | 73 | second retractable rod |
| 74 | second disk | 701 | sixth pin hole |
| 702 | second mounting hole | 703 | seventh pin hole |

DETAILED DESCRIPTION OF THE EMBODIMENTS

Figure 2:
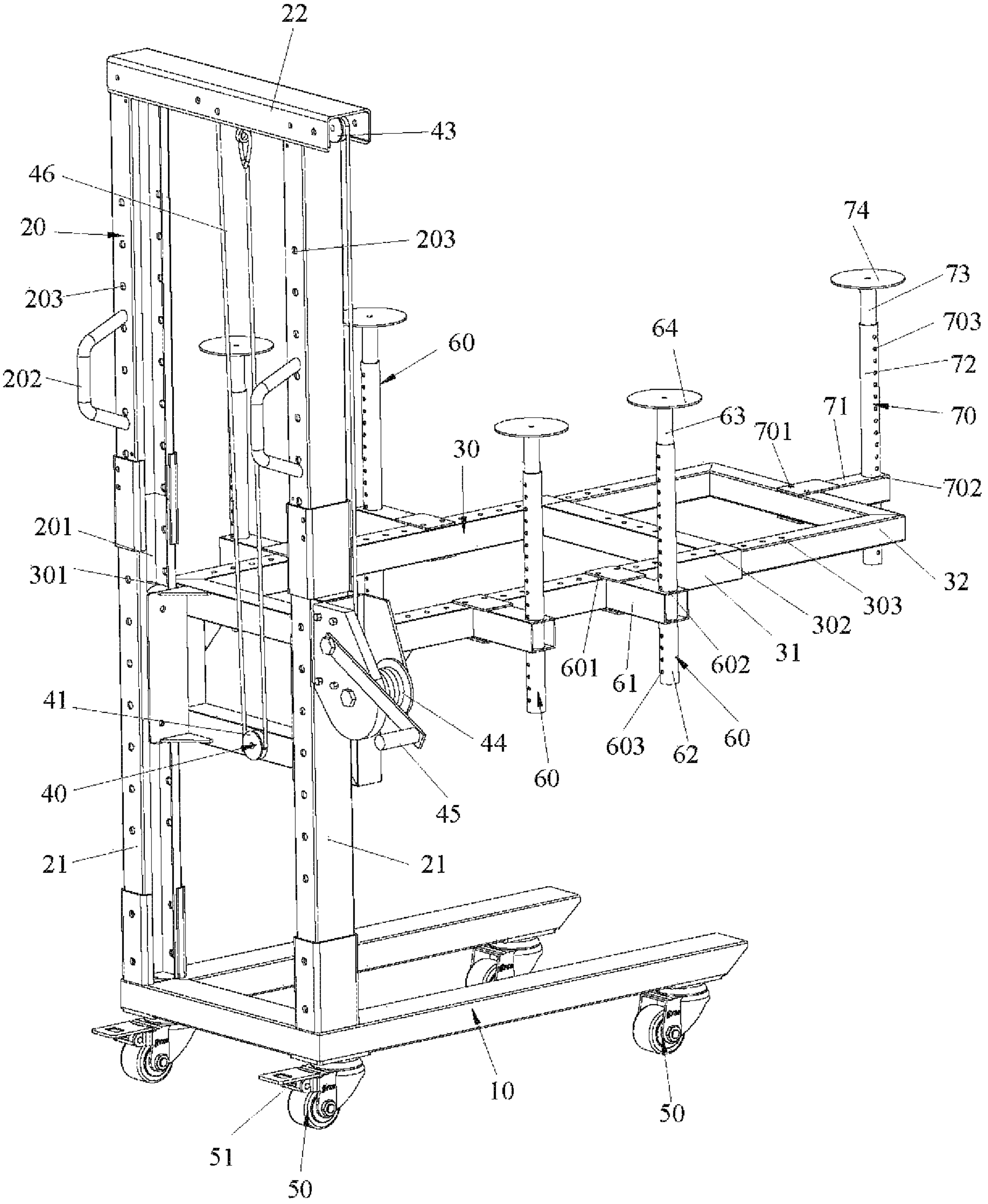
FIG. 2 is a stereoscopic diagram from another perspective of the moveable disassembling and assembling platform in accordance with some preferred embodiments of the present disclosure.
Figure 3:
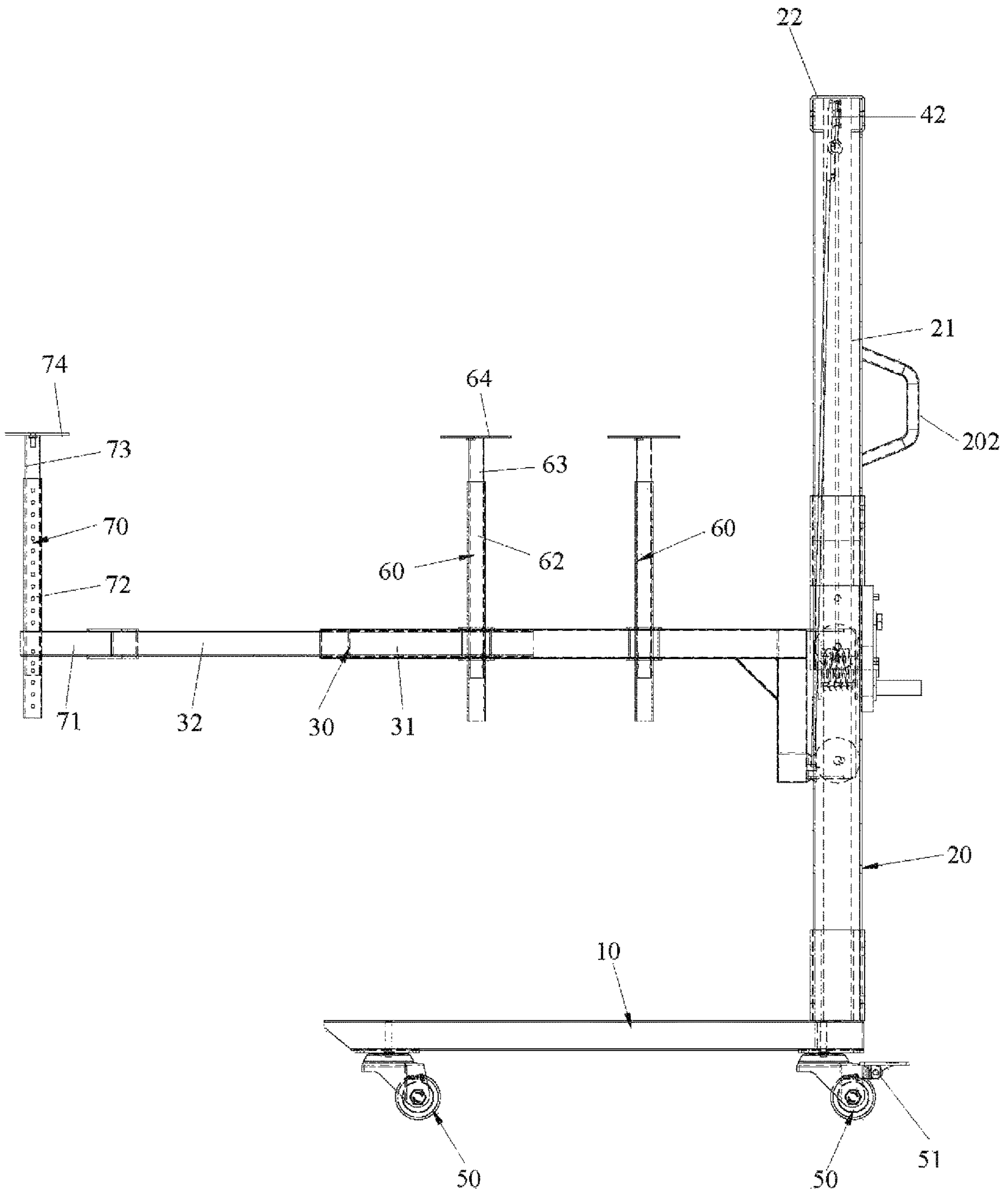
FIG. 3 is a side view of the moveable disassembling and assembling platform in accordance with some preferred embodiments of the present disclosure.

Referring to FIG. 1 to FIG. 3, in some preferred embodiments of the present disclosure, a moveable disassembling and assembling platform, including an underframe 10, a stand 20, a lifting platform 30, and a pulley mechanism 40.

The underframe 10 is configured with a plurality of casters at bottom. In some embodiments of the present disclosure, the underframe 10 has a U-shaped structure, and there are four casters 50, herein two of the casters 50 are provided at bottom of left and right sides of a front end of the underframe 10, and the other two casters 50 are casters 50 with locking mechanisms 51 and disposed at bottom of left and right sides of a back end of the underframe 10.

The stand 20 is fixed vertically to the rear side of the underframe 10. Specifically, the stand 20 includes two uprights 21 and a crossbeam 22, the two uprights 21 are configured to be provided left and right and fixed vertically to the rear side of the underframe 10, and two ends of the crossbeam 22 are configured to be fixedly connected to tops of the two uprights 21, respectively. The two uprights 21 are formed with guide slots 201 on inner sides and the guide slots 201 extend vertically. And, the two uprights 21 are provided with handles 202 on a rear side for pushing and pulling. A plurality of locking holes 203 spacing arranged upper and lower are opened in each of the uprights 21, which are used for inserting locking pins for locking with the lifting position of the lifting platform 30.

The lifting platform 30 is configured to be lifted up and down on the stand 20 and extends forwardly, at least two first supporting mechanisms 60 spacing arranged in front and back are provided on both left and right sides of the lifting platform 30, each of the first support mechanisms 60 is configured to be front- and back-adjustable positionally mounted on the lifting platform 30, and a second supporting mechanism 70 is provided on a front side of the lifting platform 30.

The lifting platform 30 is configured with rotatable guide wheels 301 on both sides of a rear end, and the guide wheels 301 are configured to be embedded in the guide slots 201 and move back and forth along the guide slots 201. And, the lifting platform 30 is a retractable lifting platform, including a main frame 31 and a retractable shelf 32, a rear end of the main frame 31 is configured to be mounted on the stand 20 and extends forward and backward, the retractable shelf 32 is configured to be mounted on a front end of the main frame 31 in a fore-aft retractable movement adjustable manner, and the second supporting mechanism 70 is provided on a front side of the retractable shelf 32. The main frame 31 is opened with a plurality of first pin holes 302 spacing arranged in front and back on both left and right side surfaces, a rear end of the retractable shelf 32 is inserted into a front interior of the main frame 31, a plurality of second pin holes 303 spacing arranged in front and back are provided on both left and right sides of the retractable shelf 32, and the second pin holes 303 are configured to mate with the first pin holes 302 for positioning by insertion of a retaining pin (not shown in the figures).

The first supporting mechanism 60 includes a first fixed rod 61, a first movable rod 62, and a first retractable rod 63. Herein the first fixed rod 61 extends horizontally from left to right, an inner end of the first fixed rod 61 is configured to clamp a side edge of the main frame 31 and the inner end of the first fixed rod 61 is opened with a third pin hole 601, the third pin hole 601 is configured to mate with the first pin holes 302, and the inner end of the first fixed rod 62 is opened with a first mounting hole 602. Herein the first movable rod 62 extends vertically and is inserted into the first mounting hole 602 to move up and down along the first mounting hole 602, and the first movable rod 62 is opened with a plurality of fourth pin holes 603 spacing arranged up and down. Herein the first retractable rod 63 extends vertically and is provided at an upper end of the first movable rod 62, the first retractable rod 63 is retracted up and down with respect to the first movable rod 62, the first retractable rod 63 is opened with a fifth pin hole (not shown in the figures) cooperating with the fourth pin holes 603, and the first retractable rod 62 is fixed with a first disk 64 or a first U-shaped disk at a top (not shown in the figures).

The second supporting mechanism 70 includes a second fixed rod 71, a second movable rod 72 and a second retractable rod 73. Herein the second fixed rod 71 extends horizontally back and forth, an inner end of the second fixed rod 71 clamps the front side of the retractable shelf 32. And, the inner end of the second fixed rod 71 is opened with a sixth pin hole 701, so as to securely connect to the retractable shelf 32 by means of the retaining pin. In addition, the inner end of the second fixed rod 71 is opened with a second mounting hole 702. The second movable rod 72 extends vertically and is inserted into the second mounting hole 702 to move up and down along the second mounting hole 702, and the second movable rod 72 is opened with a plurality of seventh pin holes s703 pacing arranged up and down. The second retractable rod 73 extends vertically and is provided at an upper end of the second movable rod 72, the second retractable rod 73 is retracted up and down with respect to the second movable rod 72, the second retractable rod 73 is opened with an eighth pin hole (not shown in the figures) cooperating with the seventh pin holes 703, and the second retractable rod 73 is fixed with a second disk 74 or a second U-shaped disk (not shown in the figures) at a top.

The pulley mechanism 40 is disposed between the stand 20 and the lifting platform 30 to drive the lifting platform 30 for lifting and lowering movements. Specifically, the pulley mechanism 40 is a hand-operated pulley mechanism, including a first pulley 41, a second pulley 42, a third pulley 43, a reel 44, a rocker arm 45 and a dragrope 46. The first pulley 41 is rotatably disposed at middle on a rear side of the lifting platform 30, the second pulley 42 is rotatably disposed at middle of the crossbeam 22, and the third pulley 43 is rotatably disposed at an end of the third crossbeam 22. The reel 44 and the rocker arm 45 are rotatably disposed on outside of one of the uprights 21, the reel 44 is located below the third pulley 43, the rocker arm 45 drives the reel 44 to rotate back and forth, one end of the dragrope 46 is fixedly connected to the middle of the crossbeam 22, and the dragrope 46 is wrapped around the reel 44 after winding through the first pulley 41, the second pulley 42, and the third pulley 43 in turn.

Working principle of the embodiments of the present disclosure is described in detail as follows.

When disassembling the hard tops, the disk is used for each of the supporting mechanism. And when disassembling the soft tops, the U-shaped disk is used for each of the supporting mechanism. And when disassembling, the moveable dissembling and assembling platform of the present disclosure is first pushed as a whole underneath the hard or soft tops, and then, by hand operating the rocker arm 45, the lifting platform 30 is made to rise, the first supporting mechanism 60 and the second supporting mechanism 70 are risen with the lifting platform 30 until the first supporting mechanism 60 and the second supporting mechanism 70 support the hard or soft tops. Then disassembly of the hard or soft tops is performed, and after the disassembly, the hard or soft tops is moved by pushing the moveable platform of the present disclosure, so that the hard or soft tops is moved with the moveable platform to a corresponding position for repair, and after the repair/maintenance is completed, the hard or soft tops is moved to the frame by the moveable platform of the present disclosure, and then assembly of the hard or soft tops is performed. The moveable platform of present disclosure can also be used for disassembling and assembling other automobile parts such as bumpers.

Designs of the present invention focuses on in that, by using the pulley mechanism to drive the lifting platform to lift up and down, and cooperating with the first and the second supporting mechanisms to provide a solid and effective support for large automobile parts such as hard tops and soft tops, it can be operated by only one person, thereby reducing labor and improving efficiency, and meanwhile the moveable disassembling and assembling platform has a simple overall structure and low cost, which is worthy of popularization.

Technical principles of the present disclosure are described above in connection with specific embodiments. These descriptions are only intended to explain the principles of the present invention and are not to be construed in any way as a limitation on scope of protection of the present disclosure. Based on explanations herein, other specific embodiments of the present disclosure can be associated by a person ordinary skill in the art without creative labor, which will fall within the scope of protection of the present disclosure.

What is claimed is:

1. A moveable disassembling and assembling platform, comprising an underframe, a stand, a lifting platform, and a pulley mechanism; wherein:

the underframe is configured with a plurality of casters at bottom;

the stand is fixed vertically to a rear side of the underframe;

the lifting platform is configured to be lifted up and down on the stand and extend forwardly, at least two first supporting mechanisms spacing arranged in front and back are provided on both left and right sides of the lifting platform, each of the first support mechanisms is configured to be front- and back-adjustable positionally mounted on the lifting platform, and a second supporting mechanism is provided on a front side of the lifting platform;

the pulley mechanism is disposed between the stand and the lifting platform to drive the lifting platform for lifting and lowering movements;

the stand comprises two uprights and a crossbeam, the two uprights are configured to be provided left and right and fixed vertically to the rear side of the underframe and two ends of the crossbeam are configured to be fixedly connected to tops of the two uprights, respectively;

the pulley mechanism is a hand-operated pulley mechanism and the hand-operated pulley mechanism comprises a first pulley, a second pulley, a third pulley, a reel, a rocker arm and a dragrope;

the first pulley is rotatably disposed at middle on a rear side of the lifting platform, the second pulley is rotatably disposed at middle of the crossbeam, and the third pulley is rotatably disposed at an end of the crossbeam; and, the reel and the rocker arm are rotatably disposed on outside of one of the uprights the reel is located below the third pulley, the rocker arm drives the reel to rotate back and forth, one end of the dragrope is fixedly connected to the middle of the crossbeam, and the dragrope is wrapped around the reel after winding through the first pulley, the second pulley, and the third pulley in turn.

* * * * *